(12) United States Patent
Sambhar

(10) Patent No.: US 11,620,700 B2
(45) Date of Patent: Apr. 4, 2023

(54) METHOD AND SYSTEM FOR PROVIDING TRANSPARENCY IN LOAN REQUEST BIDDING

(71) Applicant: JPMorgan Chase Bank, N.A., New York, NY (US)

(72) Inventor: Ankur Sambhar, Thane West (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 17/340,450

(22) Filed: Jun. 7, 2021

(65) Prior Publication Data

US 2022/0343417 A1   Oct. 27, 2022

(30) Foreign Application Priority Data

Apr. 23, 2021 (IN) .............................. 202111018736

(51) Int. Cl.
| | | |
|---|---|---|
| *G06Q 30/00* | (2012.01) | |
| *G06Q 30/08* | (2012.01) | |
| *G06Q 30/0601* | (2023.01) | |
| *G06Q 40/02* | (2023.01) | |

(52) U.S. Cl.
CPC ......... *G06Q 30/08* (2013.01); *G06Q 30/0629* (2013.01); *G06Q 40/025* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 2002/0038285 A1* | 3/2002 | Golden | ............... | G06Q 40/025 705/37 |
| 2019/0102835 A1* | 4/2019 | Bjonerud | ............. | G06Q 40/025 |

OTHER PUBLICATIONS

International Search Report and Written Opinion issued in corresponding International Patent Appl. No. PCT/US2022/025993, dated Jun. 16, 2022.

* cited by examiner

*Primary Examiner* — Mila Airapetian
(74) *Attorney, Agent, or Firm* — Greenblum & Bernstein, P.L.C.

(57) ABSTRACT

A method for providing loan bid information to a prospective borrower is provided. The method includes: receiving, from a user, a request for a loan that includes user preference criteria; transmitting, to each of a plurality of prospective lenders, a solicitation for bids for the requested loan, receiving a respective loan bid from each of at least one of the prospective lenders, each respective loan bid including respective bid criteria corresponding to a particular lender; analyzing each received loan bid with respect to the user preference criteria and the respective bid criteria; selecting one loan bid based on a result of the analysis, and transmitting, to the user and to each of the plurality of prospective lenders, a message that notifies a result of the selection. The request for the loan may be received from the user via a blockchain mechanism that is accessible by each prospective lender.

20 Claims, 4 Drawing Sheets

METHOD AND SYSTEM FOR PROVIDING TRANSPARENCY IN LOAN REQUEST BIDDING

CROSS-REFERENCE TO RELATED APPLICATIONS

This application claims priority benefit from Indian Application No. 202111018736, filed Apr. 23, 2021, which is hereby incorporated by reference in its entirety.

BACKGROUND

Field of the Disclosure

This technology generally relates to methods and systems for processing loan requests, and more particularly to methods and systems for providing transparency and real-time updates in a loan request bidding process in which multiple banks/lenders may participate.

1. Background Information

Conventionally, when a prospective borrower submits a request for a loan from a particular bank, the request is submitted directly to the bank, and the bank may then propose an offer for the loan. Alternatively, the prospective borrower may also submit such a request to an aggregator, and the aggregator then obtains proposals from different banks based on the loan requirements of the borrower. From the various offers, the borrower can select the most suitable proposal.

In the process of using an aggregator to obtain multiple proposals from several banks, there is a lack of transparency in generating and adjusting the parameters of each proposal. In this aspect, the borrower relies on the aggregator, and there may be a delay in providing current information to the borrower when new information becomes available.

Accordingly, there is a need for a mechanism to provide transparency and real-time updates in a loan bidding process so that banks and prospective borrowers may have confidence that the best and most current information is available to them.

SUMMARY

The present disclosure, through one or more of its various aspects, embodiments, and/or specific features or sub-components, provides, inter alia, various systems, servers, devices, methods, media, programs, and platforms for providing transparency and real-time updates in a loan request bidding process in which multiple banks/lenders may participate.

According to an aspect of the present disclosure, a method for providing transparency and real-time updates in a loan request bidding process in which multiple banks/lenders may participate is provided. The method is implemented by at least one processor. The method includes: receiving, by the at least one processor from a user, a request for a loan that includes at least one user preference criterion; transmitting, by the at least one processor to each of a plurality of prospective lenders, a solicitation for bids for the requested loan; receiving, by the at least one processor, a respective loan bid from each of at least one from among the plurality of prospective lenders, each respective loan bid including at least one respective bid criterion that corresponds to a lender from among the plurality of prospective lenders; analyzing, by the at least one processor, each received loan bid with respect to the at least one user preference criterion and the respective bid criteria; selecting, by the at least one processor, one loan bid based on a result of the analyzing; and transmitting, by the at least one processor to the user and to each of the plurality of prospective lenders, a message that notifies a result of the selecting.

The request for the loan may be received from the user via a blockchain mechanism that is accessible by each of the plurality of prospective lenders.

The method may further include: receiving, via a user interface, information that relates to the request for the loan; and transmitting the received information that relates to the request for the loan to the blockchain mechanism. The user interface may include a plurality of prompts that facilitate an entry of the information that relates to the request for the loan by the user.

The at least one user preference criterion may include at least one from among a lowest interest rate, an earliest disbursement date, a length of tenure, and a maximum amount.

The at least one bid criterion may include at least one from among a requested amount, a customer risk rating, a loan tenure, and a user occupation.

The method may further include receiving, from at least one lender from among the plurality of prospective lenders, an updated loan bid.

The method may further include receiving, from the user, at least one updated user preference criterion.

The method may further include displaying, on a user interface, a smart contract that corresponds to a result of the selecting and that is configured to facilitate execution of the loan by the user.

The method may further include displaying, on the user interface, information that corresponds to at least one loan bid that is not selected based on a result of the analyzing.

According to another exemplary embodiment, a computing apparatus for providing loan bid information to a prospective borrower is provided. The computing apparatus includes a processor; a memory; and a communication interface coupled to each of the processor and the memory. The processor is configured to: receive, from a user via the communication interface, a request for a loan that includes at least one user preference criterion; transmit, to each of a plurality of prospective lenders via the communication interface, a solicitation for bids for the requested loan; receive, via the communication interface, a respective loan bid from each of at least one from among the plurality of prospective lenders, each respective loan bid including at least one respective bid criterion that corresponds to a lender from among the plurality of prospective lenders; analyze each received loan bid with respect to the at least one user preference criterion and the respective bid criteria; select one loan bid based on a result of the analysis; and transmit, to the user and to each of the plurality of prospective lenders via the communication interface, a message that notifies a result of the selection of the one loan bid.

The request for the loan may be received from the user via a blockchain mechanism that is accessible by each of the plurality of prospective lenders.

The processor may be further configured to: receive, via a user interface and the communication interface, information that relates to the request for the loan; and transmit, via the communication interface, the received information that relates to the request for the loan to the blockchain mechanism. The user interface may include a plurality of prompts that facilitate an entry of the information that relates to the request for the loan by the user.

The at least one user preference criterion may include at least one from among a lowest interest rate, an earliest disbursement date, a length of tenure, and a maximum amount.

The at least one bid criterion may include at least one from among a requested amount, a customer risk rating, a loan tenure, and a user occupation.

The processor may be further configured to receive, from at least one lender from among the plurality of prospective lenders via the communication interface, an updated loan bid.

The processor may be further configured to receive, from the user via the communication interface, at least one updated user preference criterion.

The processor may be further configured to display, on a user interface, a smart contract that corresponds to a result of the selection of the one loan bid and that is configured to facilitate execution of the loan by the user.

The processor may be further configured to display, on the user interface, information that corresponds to at least one loan bid that is not selected based on a result of the analysis.

According to yet another exemplary embodiment, a non-transitory computer readable storage medium storing instructions for providing loan bid information to a prospective borrower is provided. The storage medium includes executable code which, when executed by a processor, causes the processor to: receive, from a user, a request for a loan that includes at least one user preference criterion; transmit, to each of a plurality of prospective lenders, a solicitation for bids for the requested loan; receive a respective loan bid from each of at least one from among the plurality of prospective lenders, each respective loan bid including at least one respective bid criterion that corresponds to a lender from among the plurality of prospective lenders; analyze each received loan bid with respect to the at least one user preference criterion and the respective bid criteria; select one loan bid based on a result of the analysis; and transmit, to the user and to each of the plurality of prospective lenders, a message that notifies a result of the selection of the one loan bid.

The executable code may be further configured to cause the processor to receive the request for the loan from the user via a blockchain mechanism that is accessible by each of the plurality of prospective lenders.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
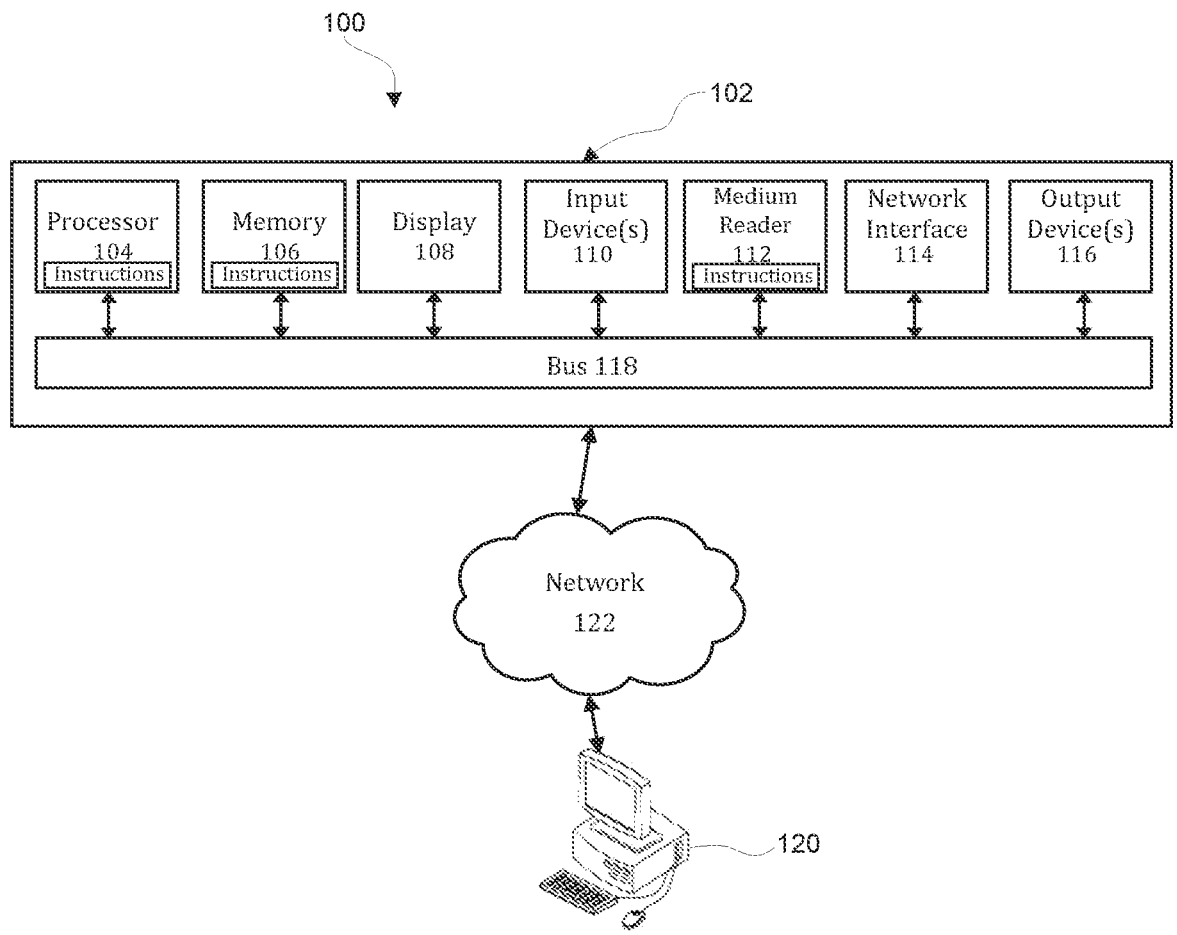
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component.

The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing transparency and real-time updates in a loan request bidding process in which multiple banks/lenders may participate.

Figure 2:
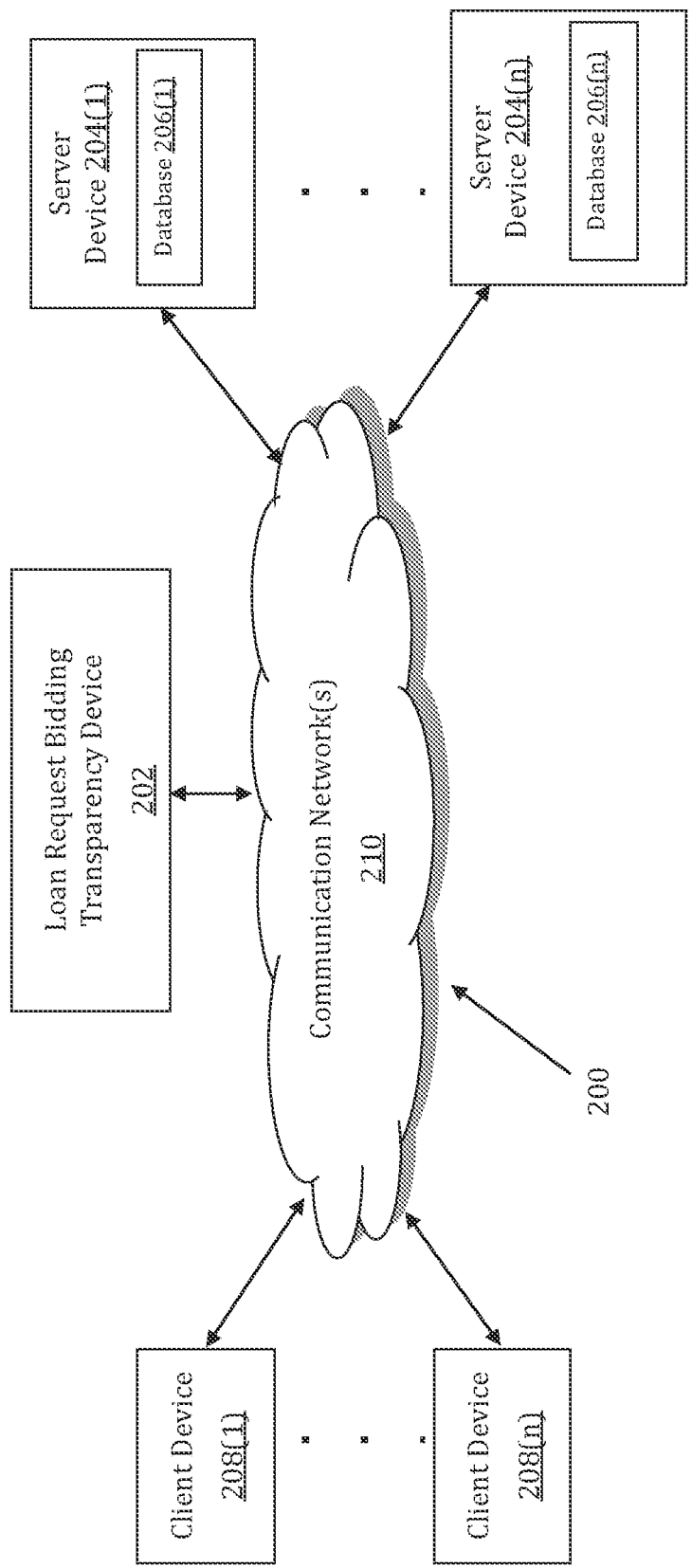
FIG. 2 illustrates an exemplary diagram of a network environment.

Referring to FIG. 2, a schematic of an exemplary network environment 200 for implementing a method for providing transparency and real-time updates in a loan request bidding process in which multiple banks/lenders may participate is illustrated. In an exemplary embodiment, the method is executable on any networked computer platform, such as, for example, a personal computer (PC).

The method for providing transparency and real-time updates in a loan request bidding process in which multiple banks/lenders may participate may be implemented by a Loan Request Bidding Transparency (LRBT) device 202. The LRBT device 202 may be the same or similar to the computer system 102 as described with respect to FIG. 1. The LRBT device 202 may store one or more applications that can include executable instructions that, when executed by the LRBT device 202, cause the LRBT device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LRBT device 202 itself, may be located in virtual server(s) running in a cloud-based computing environment rather than being tied to one or more specific physical network computing devices. Also, the application(s) may be running in one or more virtual machines (VMs) executing on the LRBT device 202. Additionally, in one or more embodiments of this technology, virtual machine(s) running on the LRBT device 202 may be managed or supervised by a hypervisor.

In the network environment 200 of FIG. 2, the LRBT device 202 is coupled to a plurality of server devices 204(1)-204(n) that hosts a plurality of databases 206(1)-206(n), and also to a plurality of client devices 208(1)-208(n) via communication network(s) 210. A communication interface of the LRBT device 202, such as the network interface 114 of the computer system 102 of FIG. 1, operatively couples and communicates between the LRBT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LRBT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and LRBT devices that efficiently implement a method for providing transparency and real-time updates in a loan request bidding process in which multiple banks/lenders may participate.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LRBT device 202 may be a standalone device or integrated with one or more other devices or apparatuses, such as one or more of the server devices 204(1)-204(n), for example. In one particular example, the LRBT device 202 may include or be hosted by one of the server devices 204(1)-204(n), and other arrangements are also possible. Moreover, one or more of the devices of the LRBT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LRBT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to lender-specific loan bidding and data that relates to borrower-specific loan request criteria.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the LRBT device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the LRBT device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the LRBT device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LRBT device 202, the server devices 204(1)-204(*n*), or the client devices 208(1)-208(*n*), for example, may be configured to operate as virtual instances on the same physical machine. In other words, one or more of the LRBT device 202, the server devices 204 (1)-204(*n*), or the client devices 208(1)-208(*n*) may operate on the same physical device rather than as separate devices communicating through communication network(s) 210. Additionally, there may be more or fewer LRBT devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
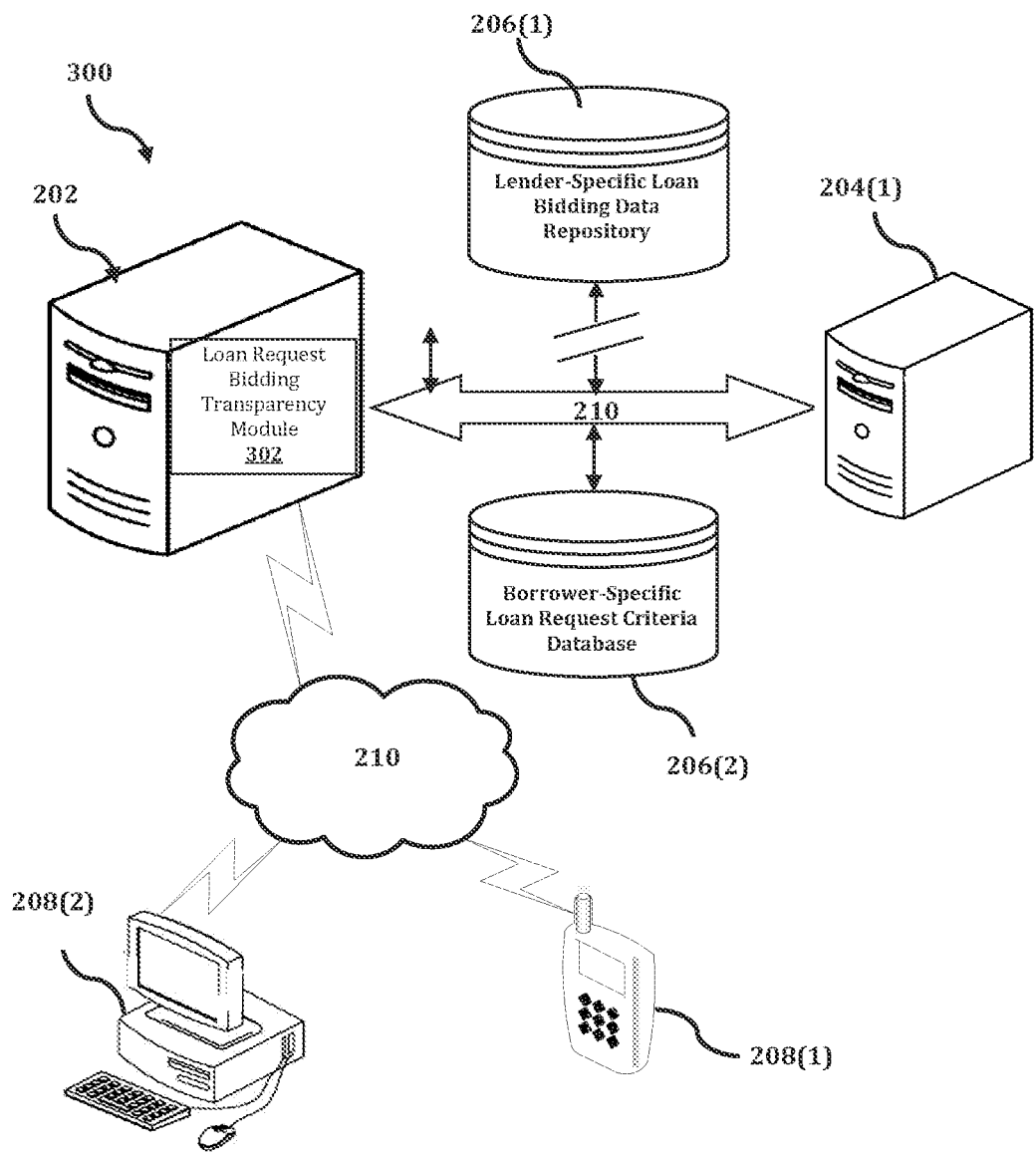
FIG. 3 shows an exemplary system for implementing a method for providing transparency and real-time updates in a loan request bidding process in which multiple banks/lenders may participate.

The LRBT device 202 is described and illustrated in FIG. 3 as including a loan request bidding transparency module 302, although it may include other rules, policies, modules, databases, or applications, for example. As will be described below, the loan request bidding transparency module 302 is configured to implement a method for providing transparency and real-time updates in a loan request bidding process in which multiple banks/lenders may participate.

An exemplary process 300 for implementing a mechanism for providing transparency and real-time updates in a loan request bidding process in which multiple banks/lenders may participate by utilizing the network environment of FIG. 2 is illustrated as being executed in FIG. 3. Specifically, a first client device 208(1) and a second client device 208(2) are illustrated as being in communication with LRBT device 202. In this regard, the first client device 208(1) and the second client device 208(2) may be "clients" of the LRBT device 202 and are described herein as such. Nevertheless, it is to be known and understood that the first client device 208(1) and/or the second client device 208(2) need not necessarily be "clients" of the LRBT device 202, or any entity described in association therewith herein. Any additional or alternative relationship may exist between either or both of the first client device 208(1) and the second client device 208(2) and the LRBT device 202, or no relationship may exist.

Further, LRBT device 202 is illustrated as being able to access a lender-specific loan bidding data repository 206(1) and a borrower-specific loan request criteria database 206 (2). The loan request bidding transparency module 302 may be configured to access these databases for implementing a method for providing transparency and real-time updates in a loan request bidding process in which multiple banks/lenders may participate.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the LRBT device 202 via broadband or cellular communication. Of course, these embodiments are merely exemplary and are not limiting or exhaustive.

Upon being started, the loan request bidding transparency module 302 executes a process for providing transparency and real-time updates in a loan request bidding process in which multiple banks/lenders may participate. An exemplary process for providing transparency and real-time updates in a loan request bidding process in which multiple banks/lenders may participate is generally indicated at flowchart 400 in FIG. 4.

Figure 4:
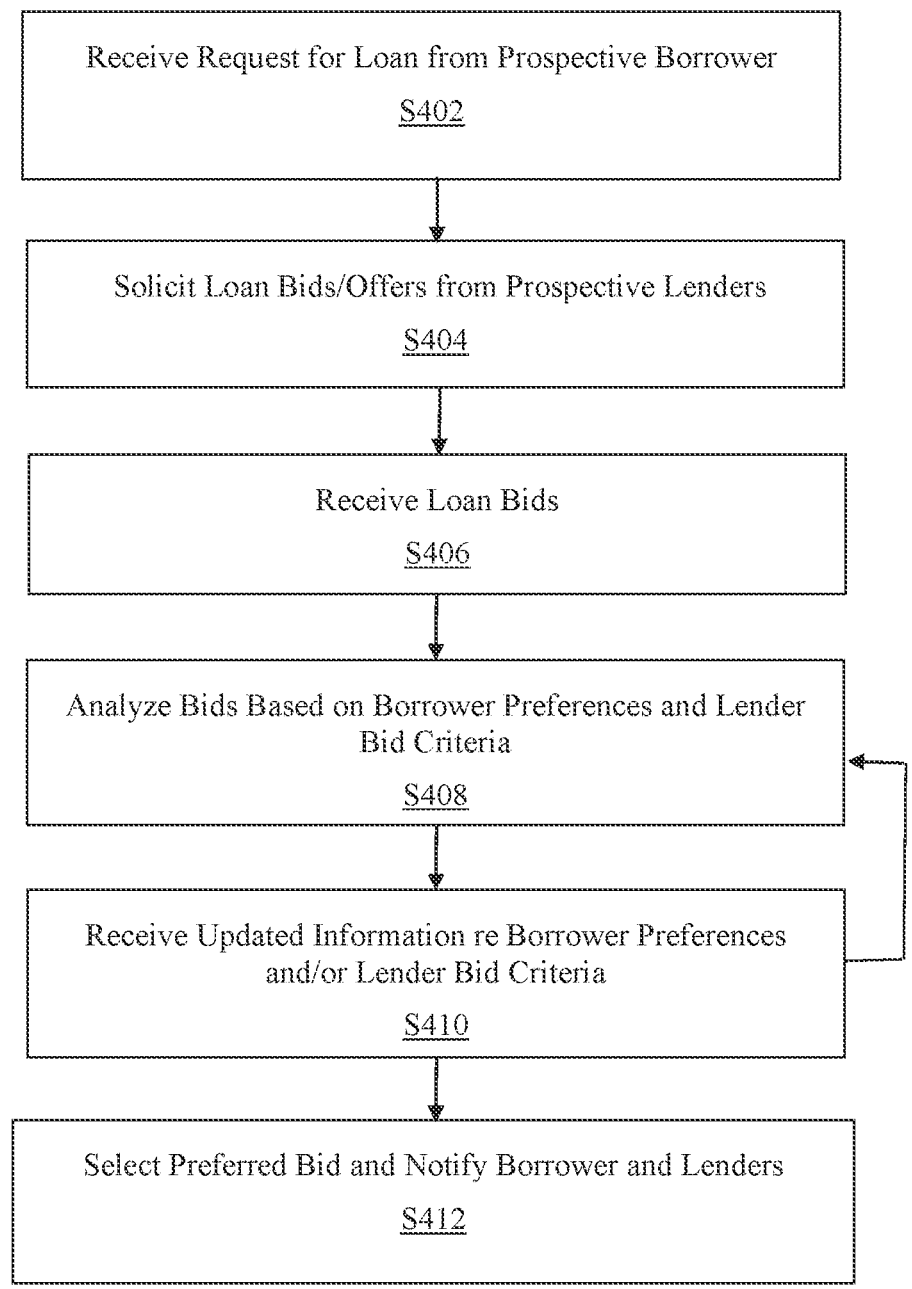
FIG. 4 is a flowchart of an exemplary process for implementing a method for providing transparency and real-time updates in a loan request bidding process in which multiple banks/lenders may participate.

In process 400 of FIG. 4, at step S402, the loan request bidding transparency module 302 receives a request for a loan from a prospective borrower. In an exemplary embodiment, the request for the loan is submitted to a blockchain that is accessible by many prospective lenders, such as banks and/or financial institutions. The blockchain may be accessible to the prospective borrower via a user interface that facilitates entry of information for the loan request by displaying prompts for specific types of information.

In an exemplary embodiment, the request for the loan is accompanied by bid preference criteria specified by the prospective borrower. The bid preference criteria may include, for example, any one or more of a lowest interest rate, an earliest disbursement date, a length of tenure, a maximum amount, and/or any other suitable preference criterion.

At step S404, the loan request bidding transparency module 302 solicits loan offers from prospective lenders. In an exemplary embodiment, a solicitation is transmitted to the prospective lenders via the blockchain. By using the blockchain, the loan requests and solicitations may be accessed via a user interface that facilitates real-time review of information relating to the loan, thereby providing transparency to all interested parties. Alternatively, a solicitation may be transmitted directly to each prospective lender.

At step S406, the loan request bidding transparency module 302 receives loan bids from prospective lenders. In an exemplary embodiment, each respective loan bid is accompanied by bid criteria that are specified by the corresponding lender. The bid criteria may include, for example, any one or more of a requested amount, a customer risk rating, a loan tenure, a borrower occupation, and/or any other suitable bid criterion.

At step S408, the loan request bidding transparency module 302 analyzes the received loan bids based on the bid preference criteria received from the prospective borrower and the respective bid criteria from each corresponding lender. Then, at step S410, the loan request bidding transparency module 302 receives updated information that may adjust the bid preference criteria of the prospective borrower and/or bid criteria for one or more lenders. In this aspect, as a result of the transparency of the bidding process that is afforded by the use of the blockchain, the interested parties may determine that an adjustment to the criteria may affect the final determination as to which bid will be selected and what the final terms of the loans will be.

At step S412, the loan request bidding transparency module 302 selects a preferred bid and notifies all interested parties of the selection. In an exemplary embodiment, the selection of the preferred bid is based on a result of the analysis performed in step S408, and the notification may be effected by transmitting a notification message to the borrower and to each lender.

In an exemplary embodiment, a user's loan request will be a subject of bids submitted by various banks in real-time and the most suitable offer will be selected by the system based on the user and bank preferences.

In an exemplary embodiment, the user will put up the loan requirement on the blockchain, which is shared across multiple banks. Based on user requirements, each bank will provide its own bid. While placing the loan request, the user will also specify the preference for selecting the bid. The user can specify lowest rate of interest, earliest disbursement, longer tenure, maximum amount offered, and any other relevant information. Similarly, banks will also specify the preference from their end while placing the bid. Banks can provide their bidding criteria, such as, for example, requested amount, risk rating of customer, loan tenure, user occupation, etc.

In an exemplary embodiment, bid selection intelligence will be part of the smart contract, which will analyze all the bids from different banks and then perform a match operation against the preference criteria specified by the user. Once the bid is selected, the user will be notified about the selected bid and the loan request will be transferred to the selected banks existing processing system.

In an exemplary embodiment, a group of banks will participate in the bidding process for a specific loan request processing. A private or public blockchain will be leveraged to allow the user to put up the loan request and banks to bid for the same. To capture the user request, a bank or a third party vendor will create an application which will provide a user interface to facilitate a submission of a loan request. After capturing the request, this application will submit this loan request to the blockchain network (private/public/permissioned) shared by the group of participating banks. The request will be published to the blockchain network by executing a transaction. The user's selection preference for the proposal can either be captured as part of loan request or could even be captured separately. These details will be embedded in a user-specific smart contract, which will be created by the request capturing application, and will be deployed to the blockchain.

Similarly, each of the participating banks will also be providing a set of bidding rules which will determine the bank's proposal for the given request. Each of this bank's specific rules will be embedded in a bank specific smart contract in encrypted format and will be deployed in the blockchain. These rules will determine if the bank will be participating in the bidding process and what would the proposal to be for the given loan request. A sample rule could be:
  if customer works in a multi-national corporation (MNC)
    as a permanent employee
    with a monthly salary of $10000
    requesting a personal loan not more than $40000
    with a repayment tenure of 2 years
    has an A credit rating
    determined socially positive
  then offer rate of interest of 5%
    with immediate disbursement
    no foreclosure charges
    no processing fees In an exemplary embodiment, bid matching will happen through a smart contract which will retrieve the user loan request details, user preference criteria, and banks rules. Based on the user preferences and banks' bidding criteria, the smart contract will evaluate all the banks' rules for the given request and find the most suitable bank proposal.

Once the proposal is selected, the smart contract will notify the user and will also send across the loan request to the respective bank's processing system.

Benefits: 1) The various banks can bid in real-time for the various loan requests. 2) Banks will be able to change the rules to meet their respective business needs. 3) The user will have the complete transparency about the process and will obtain the best proposal across the banks. 4) The user will be able to change/specify the selection criteria at any time. 5) If desired, banks can specify to place the bid in real-time rather than making a decision based on the pre-defined rules.

Accordingly, with this technology, an optimized process for providing transparency and real-time updates in a loan request bidding process in which multiple banks/lenders may participate is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for providing loan bid information to a prospective borrower, the method being implemented by at least one processor, the method comprising:

receiving, by the at least one processor from a user, a request for a loan that includes at least one user preference criterion, wherein the request for the loan is received from the user via a blockchain mechanism that is accessible by each of a plurality of prospective lenders;

transmitting, by the at least one processor to each of the plurality of prospective lenders, a solicitation for bids for the requested loan;

receiving, by the at least one processor, a respective loan bid from each of at least one from among the plurality of prospective lenders, each respective loan bid including at least one respective bid criterion that corresponds to a lender from among the plurality of prospective lenders;

analyzing, by the at least one processor, each received loan bid with respect to the at least one user preference criterion and the respective bid criteria;

selecting, by the at least one processor, one loan bid based on a result of the analyzing; and transmitting, by the at least one processor to the user and to each of the plurality of prospective lenders, a message that notifies a result of the selecting.

2. The method of claim 1, further comprising:

receiving, via a user interface, information that relates to the request for the loan; and transmitting the received information that relates to the request for the loan to the blockchain mechanism, wherein the user interface includes a plurality of prompts that facilitate an entry of the information that relates to the request for the loan by the user.

3. The method of claim 1, wherein the at least one user preference criterion includes at least one from among a lowest interest rate, an earliest disbursement date, a length of tenure, and a maximum amount.

4. The method of claim 1, wherein the at least one bid criterion includes at least one from among a requested amount, a customer risk rating, a loan tenure, and a user occupation.

5. The method of claim 1, further comprising receiving at least one from among: an updated loan bid from at least one lender from among the plurality of prospective lenders; and at least one updated user preference criterion from the user.

6. The method of claim 1, further comprising displaying, on a user interface, a smart contract that corresponds to a result of the selecting and that is configured to facilitate execution of the loan by the user.

7. The method of claim 6, further comprising displaying, on the user interface, information that corresponds to at least one loan bid that is not selected based on a result of the analyzing.

8. A computing apparatus for providing loan bid information to a prospective borrower, the computing apparatus comprising:

a processor;

a memory; and a communication interface coupled to each of the processor and the memory, wherein the processor is configured to:

receive, from a user via the communication interface, a request for a loan that includes at least one user preference criterion, wherein the request for the loan is received from the user via a blockchain mechanism that is accessible by each of a plurality of prospective lenders;

transmit, to each of the plurality of prospective lenders via the communication interface, a solicitation for bids for the requested loan;

receive, via the communication interface, a respective loan bid from each of at least one from among the plurality of prospective lenders, each respective loan bid including at least one respective bid criterion that corresponds to a lender from among the plurality of prospective lenders;

analyze each received loan bid with respect to the at least one user preference criterion and the respective bid criteria;

select one loan bid based on a result of the analysis; and transmit, to the user and to each of the plurality of prospective lenders via the communication interface, a message that notifies a result of the selection of the one loan bid.

9. The computing apparatus of claim 8, wherein the processor is further configured to:

receive, via a user interface and the communication interface, information that relates to the request for the loan; and transmit, via the communication interface, the received information that relates to the request for the loan to the blockchain mechanism, wherein the user interface includes a plurality of prompts that facilitate an entry of the information that relates to the request for the loan by the user.

10. The computing apparatus of claim 8, wherein the at least one user preference criterion includes at least one from among a lowest interest rate, an earliest disbursement date, a length of tenure, and a maximum amount.

11. The computing apparatus of claim 8, wherein the at least one bid criterion includes at least one from among a requested amount, a customer risk rating, a loan tenure, and a user occupation.

12. The computing apparatus of claim 8, wherein the processor is further configured to receive at least one from among: an updated loan bid from at least one lender from among the plurality of prospective lenders; and at least one updated user preference criterion from the user.

13. The computing apparatus of claim 8, wherein the processor is further configured to display, on a user interface, a smart contract that corresponds to a result of the selection of the one loan bid and that is configured to facilitate execution of the loan by the user.

14. The computing apparatus of claim 13, wherein the processor is further configured to display, on the user interface, information that corresponds to at least one loan bid that is not selected based on a result of the analysis.

15. A non-transitory computer readable storage medium storing instructions for providing loan bid information to a prospective borrower, the storage medium comprising executable code which, when executed by a processor, causes the processor to:

receive, from a user, a request for a loan that includes at least one user preference criterion, wherein the request for the loan is received from the user via a blockchain mechanism that is accessible by each of a plurality of prospective lenders;

transmit, to each of the plurality of prospective lenders, a solicitation for bids for the requested loan;

receive a respective loan bid from each of at least one from among the plurality of prospective lenders, each respective loan bid including at least one respective bid criterion that corresponds to a lender from among the plurality of prospective lenders;

analyze each received loan bid with respect to the at least one user preference criterion and the respective bid criteria;

select one loan bid based on a result of the analysis; and transmit, to the user and to each of the plurality of prospective lenders, a message that notifies a result of the selection of the one loan bid.

16. The storage medium of claim 15, wherein the executable code is further configured to cause the processor to receive at least one from among: an updated loan bid from at least one lender from among the plurality of prospective lenders; and at least one updated user preference criterion from the user.

17. The method of claim 5, further comprising:

providing, by the blockchain mechanism, a transparency of the at least one from among the updated loan bid and the at least one updated user preference criterion; and enabling, by the transparency, a determination that the selecting the one loan bid based on the result of the analysis, is affected by the at least one from among the updated loan bid and the at least one updated user preference criterion.

18. The computing apparatus of claim 12, wherein the processor is further configured to:

provide, by the blockchain mechanism, a transparency of the at least one from among the updated loan bid and the at least one updated user preference criterion; and enable, by the transparency, a determination that the select the one loan bid based on the result of the analysis, is affected by the at least one from among the updated loan bid and the at least one updated user preference criterion.

19. The storage medium of claim 16, wherein the executable code is further configured to cause the processor to:

provide, by the blockchain mechanism, a transparency of the at least one from among the updated loan bid and the at least one updated user preference criterion; and enable, by the transparency, a determination that the select the one loan bid based on the result of the analysis, is affected by the at least one from among the updated loan bid and the at least one updated user preference criterion.

20. The method of claim 6, wherein the smart contract is deployed in the blockchain mechanism, wherein an encrypted form of a bank-specific rule from each of the at least one from among the plurality of prospective lenders is embedded in the smart contract, and wherein the bank-specific rule determines a proposal for the respective loan bid from each of the at least one from among the plurality of prospective lenders.

* * * * *